(12) United States Patent
Ohtsukasa (10) Patent No.: US 8,327,638 B2
(45) Date of Patent: Dec. 11, 2012

(54) HYDRAULIC DRIVE APPARATUS AND HYDRAULICALLY-DRIVEN VEHICLE

(75) Inventor: Naritoshi Ohtsukasa, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 810 days.

(21) Appl. No.: 12/449,102

(22) PCT Filed: Jan. 9, 2008

(86) PCT No.: PCT/JP2008/050133
§ 371 (c)(1),
(2), (4) Date: Jul. 23, 2009

(87) PCT Pub. No.: WO2008/090762
PCT Pub. Date: Jul. 31, 2008

(65) Prior Publication Data
US 2009/0320462 A1    Dec. 31, 2009

(30) Foreign Application Priority Data

Jan. 24, 2007   (JP) ................................ 2007-013873

(51) Int. Cl.
*F16H 61/42*     (2010.01)
*E02F 9/22*      (2006.01)

(52) U.S. Cl. .......................................... 60/445; 701/50
(58) Field of Classification Search .................... 60/431, 60/445, 490; 701/50
See application file for complete search history.

(56) References Cited

U.S. PATENT DOCUMENTS

| | | | |
|---|---|---|---|
| 5,638,677 A | 6/1997 | Hosono et al. | |
| 5,784,883 A | 7/1998 | Ohkura et al. | |
| 5,897,176 A * | 4/1999 | Dvorak et al. | ................. 60/436 |
| 7,524,268 B2 * | 4/2009 | Oka et al. | ................. 701/50 |
| 7,686,737 B2 * | 3/2010 | Nishi et al. | ................. 477/115 |

FOREIGN PATENT DOCUMENTS

| | | |
|---|---|---|
| JP | 2-16851 | 2/1990 |
| JP | 11-257489 | 9/1999 |
| JP | 2001-27319 | 1/2001 |
| JP | 2004-232469 | 8/2004 |

OTHER PUBLICATIONS

International Search Report dated Feb. 19, 2008, issued in PCT/JP2008/050133.
Supplementary European Search Report for European Patent Application No. 08703004.5 issued May 2, 2011.

* cited by examiner

*Primary Examiner* — Thomas E Lazo
(74) *Attorney, Agent, or Firm* — Edwards Wildman Palmer LLP (57) ABSTRACT

The object of the present invention is to allow an operator to easily perform desired operations with high hydraulic efficiency, without an increase in difficulty of performing operations. A hydraulic drive apparatus of the present invention includes a pump control unit 31 that includes: a pump reference command value setting unit 31a that sets a pump reference command value for a hydraulic pump 10 in accordance with the engine speed of an engine 3; a pump correction command value calculating unit 31b that sets a pump command value by determining an inching rate in accordance with the amount of operation when an inching operation is performed, and correcting the pump reference command value in accordance with the inching rate; and a pump control command value setting unit 31c that sets a pump control command value for controlling the capacity of the hydraulic pump 10, based on the pump command value set by the pump correction command value calculating unit 31b.

5 Claims, 7 Drawing Sheets

HYDRAULIC DRIVE APPARATUS AND HYDRAULICALLY-DRIVEN VEHICLE

TECHNICAL FIELD

The present invention relates to a hydraulic drive apparatus and a hydraulically-driven vehicle with a variable displacement hydraulic pump that is driven by an engine, and a hydraulic motor of a variable capacity type that is driven by pressure oil discharged from the hydraulic pump to output drive force of the hydraulic motor. More particularly, the present invention relates to a hydraulic drive apparatus and a hydraulically-driven vehicle that is suitable for the driving system of a vehicle to be used as a construction machine such as a wheel loader or a bulldozer.

BACKGROUND ART

Some vehicles to be used as construction machines such as wheel loaders and bulldozers include a hydraulic drive apparatus called Hydro-Static Transmission (HST) between the engine as the drive source and driven wheels. A hydraulic drive apparatus includes a variable displacement hydraulic pump that is driven by an engine, and a hydraulic motor of a variable capacity type that is driven by the pressure oil discharged from the hydraulic pump. The hydraulic pump and the hydraulic motor are provided in a main hydraulic circuit that is a closed circuit. The hydraulic drive apparatus transmits the drive force generated from the hydraulic motor to the driven wheels, so as to move the vehicle.

In a vehicle that is equipped with this hydraulic drive apparatus, the capacity of the hydraulic pump and the capacity of the hydraulic motor are appropriately adjusted, so as to arbitrarily change the revolution speed ratio between the hydraulic pump and the hydraulic motor. Accordingly, the speed of the vehicle can be changed in a non-step fashion simply by pressing down the accelerator pedal without a complicated lever operation, and the operability can be dramatically increased.

In this type of hydraulic drive apparatus, the pressure loss is normally reduced by lowering the pressure of the main hydraulic circuit at the time of driving, and the hydraulic efficiency is made higher accordingly. For example, in a hydraulic drive apparatus that controls a tilt angle of the hydraulic pump in accordance with the pilot pressure from the charge pump, a cutoff valve is provided in the middle of the oil passage for supplying the pilot pressure. In such a hydraulic drive apparatus, the pilot pressure is reduced when the pressure of the main hydraulic circuit becomes equal to or higher than a cutoff pressure that is set in the cutoff valve, so as to reduce the tilt angle of the hydraulic pump. In this manner a discharge amount of the pressure oil supplied from the hydraulic pump to the main hydraulic circuit is reduced (see Patent Document 1, for example).

In some hydraulic drive apparatuses that are equipped with HST, an inching valve is provided in the oil passage for supplying the pilot pressure. In such a hydraulic drive apparatus, the pilot pressure is reduced when an operator operates an inching pedal, so as to reduce the tilt angle of the hydraulic pump. In this manner, the discharge amount of the pressure oil supplied from the hydraulic pump to the main hydraulic circuit can be restricted.

Patent Document 1: JP-A-2004-232469 (FIG. 1)

DISCLOSURE OF INVENTION

Problem to be Solved by the Invention

According to the invention disclosed in Patent Document 1, at least two cutoff pressures can be selected and set by an operator operating switches on the operating panel, and the hydraulic efficiency can be made higher.

In the invention disclosed in Patent Document 1 that takes only pressures into consideration, however, there is a possibility that trouble is caused in terms of the engine fuel efficiency, once the cutoff pressure is set at the optimum value for operating at an engine speed in the neighborhood of a rated engine speed. More specifically, in a case where the cutoff pressure is set at the optimum value for driving at an engine speed in the neighborhood of a rated engine speed, when the engine speed is reduced by reducing the pressure on the accelerator pedal or reducing the discharge amount of the pressure oil supplied from the hydraulic pump by pushing the accelerator pedal down, the pressure of the main hydraulic circuit remains equal to the pressure set by the cutoff pressure determined by taking the operation at the rated engine speed into consideration, even if some margin is allowed with respect to the engine output. As a result, driving is performed with a fuel-inefficient engine output.

To avoid such a situation, the operator should change cutoff pressures so that the main hydraulic circuit has a desired pressure, when necessary. This causes a possibility of complicating the operations of the hydraulic drive apparatus.

Therefore, the object of the present invention is to provide a hydraulic drive apparatus that allows an operator to easily perform desired operations with high hydraulic efficiency, without an increase in difficulty of performing operations, and to provide a hydraulically-driven vehicle.

Means for Solving Problem

According to an aspect of the present invention, a hydraulic drive apparatus including a variable displacement hydraulic pump that is driven by an engine and a hydraulic motor of a variable capacity type that is driven by pressure oil discharged from the hydraulic pump, and outputting drive force of the hydraulic motor includes a pump control unit. The pump control unit includes: a pump reference command value setting unit that sets a pump reference command value for the hydraulic pump in accordance with an engine speed of the engine: a pump correction command value calculating unit that sets a pump command value by determining an inching rate in accordance with an amount of operation when an inching operation is performed, and correcting the pump reference command value in accordance with the inching rate: and a pump control command value setting unit that sets a pump control command value for controlling capacity of the hydraulic pump, based on the pump command value set by the pump correction command value calculating unit. The pump control command value setting unit sets a pump control command upper limit in accordance with pressure of the pressure oil flowing between the hydraulic pump and the hydraulic motor, sets the pump command value to the pump control command value when the pump command value is equal to or smaller than the pump control command upper limit, and sets the pump control command upper limit to the pump control command value when the pump command value is larger than the pump control command upper limit.

According to another aspect of the present invention, a hydraulic drive apparatus including a variable displacement hydraulic pump that is driven by an engine and a hydraulic motor of a variable capacity type that is driven by pressure oil discharged from the hydraulic pump, and outputting drive force of the hydraulic motor includes a pump control unit. The pump control unit includes: a pump reference command value setting unit that sets a pump reference command value for the hydraulic pump in accordance with an engine speed of the engine; a pump correction command value calculating unit that sets a pump command value by determining an inching rate in accordance with an amount of operation when an inching operation is performed, and correcting the pump reference command value in accordance with the inching rate; and a pump control command value setting unit that sets a pump control command value for controlling capacity of the hydraulic pump, based on the pump command value set by the pump correction command value calculating unit. The hydraulic drive apparatus further includes a torque upper limit setting unit that sets an upper limit of output torque required for the hydraulic motor. The pump controlling unit sets the pump control command upper limit in accordance with the upper limit of the output torque set by the torque upper limit setting unit, and sets the pump control command value in accordance with the pump control command upper limit.

According to still another aspect of the present invention, a hydraulic drive apparatus including a variable displacement hydraulic pump that is driven by an engine and a hydraulic motor of a variable capacity type that is driven by pressure oil discharged from the hydraulic pump, and outputting drive force of the hydraulic motor includes a motor control unit. The motor control unit includes: a motor reference command value setting unit that sets a motor reference command value for the hydraulic motor in accordance with an engine speed of the engine; a motor correction command value calculating unit that sets a motor command value by determining an inching rate in accordance with an amount of operation when an inching operation is performed, and correcting the motor reference command value in accordance with the inching rate; and a motor control command value setting unit that sets a motor control command value for controlling capacity of the hydraulic motor, based on the motor command value set by the motor correction command value calculating unit. The motor control command value setting unit sets a motor control command upper limit in accordance with pressure of pressure oil flowing between the hydraulic pump and the hydraulic motor, sets the motor command value to the motor control command value when the motor command value is equal to or smaller than the motor control command upper limit, and sets the motor control command upper limit to the motor control command value when the motor command value is larger than the motor control command upper limit.

According to still another aspect of the present invention, a hydraulic drive apparatus including a variable displacement hydraulic pump that is driven by an engine and a hydraulic motor of a variable capacity type that is driven by pressure oil discharged from the hydraulic pump, and outputting drive force of the hydraulic motor includes a control unit. The control unit includes: a pump reference command value setting unit that sets a pump reference command value for the hydraulic pump in accordance with an engine speed of the engine; a motor reference command value setting unit that sets a motor reference command value for the hydraulic motor in accordance with the engine speed of the engine; a pump correction command value calculating unit that sets a pump command value by determining an inching rate in accordance with an amount of operation when an inching operation is performed, and correcting the pump reference command value in accordance with the inching rate; a motor correction command value calculating unit that sets a motor command value by determining an inching rate in accordance with an amount of operation when an inching operation is performed, and correcting the motor reference command value in accordance with the inching rate; a pump control command value setting unit that sets a pump control command value for controlling capacity of the hydraulic motor, based on the pump command value set by the pump correction command value calculating unit; and a motor control command value setting unit that sets a motor control command value for controlling capacity of the hydraulic motor, based on the motor command value set by the motor correction command value calculating unit. The pump control command value setting unit sets a pump control command upper limit in accordance with pressure of the pressure oil flowing between the hydraulic pump and the hydraulic motor, sets the pump command value to the pump control command value when the pump command value is equal to or smaller than the pump control command upper limit, and sets the pump control command upper limit to the pump control command value when the pump command value is larger than the pump control command upper limit. The motor control command value setting unit sets a motor control command upper limit in accordance with pressure of pressure oil flowing between the hydraulic pump and the hydraulic motor, sets the motor command value to the motor control command value when the motor command value is equal to or smaller than the motor control command upper limit, and sets the motor control command upper limit to the motor control command value when the motor command value is larger than the motor control command upper limit.

According to still another aspect of the present invention, a hydraulically-driven vehicle includes the above described hydraulic drive apparatus as a drive source to move.

Effect of the Invention

According to the present invention, the capacity reference command value that is set in accordance with the engine speed is corrected in accordance with the inching rate corresponding to the amount of operation when an inching operation is performed. Based on the corrected capacity command value, the capacity of the hydraulic pump and the capacity of the hydraulic motor are controlled. Accordingly, the pressure can be reduced in the entire range of the engine speed simply by performing an inching operation, and the hydraulic efficiency can be made higher. Furthermore, an inching operation is conventionally performed when the vehicle is moved by a small amount, and is not a special-purpose operation the operator needs to select in accordance with the conditions for the desired pressure. Thus, the operator is capable of readily performing desired operations with high hydraulic efficiency, without an increase in difficulty of operating the hydraulic drive apparatus.

EXPLANATIONS OF LETTERS OR NUMERALS 1, 2 hydraulic supply lines
3 engine
4 transfer
5 charge pump
6 working machine hydraulic pump
7 hydraulic working machine
10 HST pump
11 pump capacity setting unit
12 forward pump EPC valve
13 backward pump EPC valve
14 pump capacity control cylinder
20 HST motor
21 motor capacity setting unit
22 motor EPC valve
23 motor cylinder control valve
24 motor capacity control cylinder
30 controller
31 pump controlling unit
31a pump reference command value setting unit
31b pump correction command value calculating unit
31c pump control command value setting unit
32 motor controlling unit
32a motor reference command value setting unit
32b motor correction command value calculating unit
32c motor control command value setting unit
33 memory
40 inching potentiometer
40a inching pedal
41 driving mode changing switch
42 direction input lever switch
42a direction input lever
43 engine speed sensor
44, 45 pressure detection sensors
100 main hydraulic circuit

BEST MODE(S) FOR CARRYING OUT THE INVENTION

The following is a detailed description of preferred embodiments of a hydraulic drive apparatus and a hydraulically-driven vehicle in accordance with the present invention, with reference to the accompanying drawings.

Figure 1:
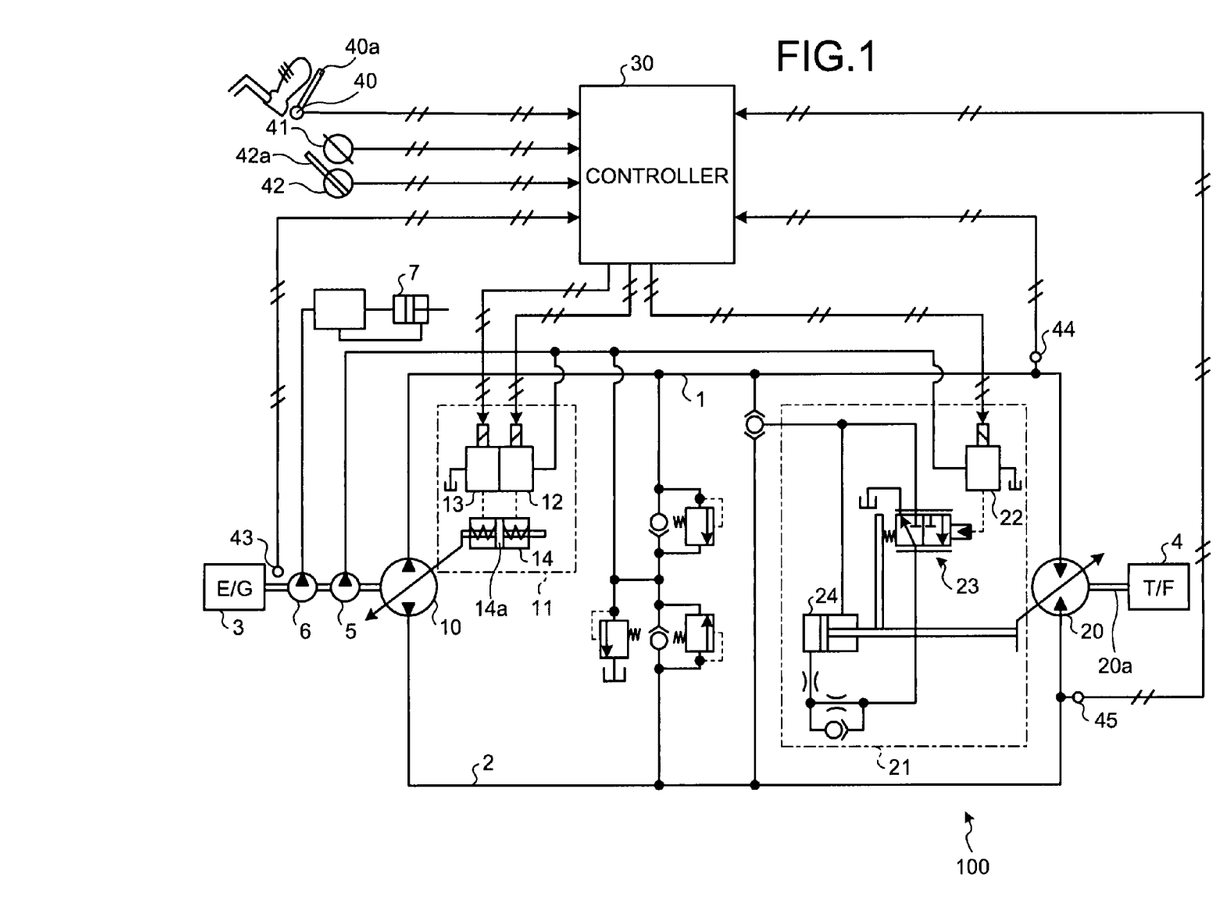
FIG. 1 is a circuit diagram showing the structure of a hydraulic drive apparatus according to an embodiment of the present invention.

FIG. 1 illustrates a hydraulic drive apparatus according to an embodiment of the present invention. The hydraulic drive apparatus shown here is so-called HST, and is mounted in a hydraulically-driven vehicle that is used as a construction machine such as a wheel loader or a bulldozer. The hydraulic drive apparatus includes a hydro-static transmission pump 10 and a hydro-static transmission motor 20 connected by hydraulic supply lines 1 and 2 of a main hydraulic circuit serving as a closed circuit.

The hydro-static transmission pump (hereinafter referred to as the "HST pump 10") is driven by a vehicle engine 3, and is of a variable-capacity type that can change its capacity by adjusting the swash plate tilt angle, for example.

The hydro-static transmission motor (hereinafter referred to as the "HST motor 20") is driven by the pressure oil discharged from the HST pump 10, and is of a variable-capacity type that can change its capacity by adjusting the swash plate tilt angle, for example. The HST motor 20 has its output axis 20a connected to driven wheels (not shown) of the vehicle via a transfer 4, and rotatively drives the driven wheels so as to move the vehicle. The HST motor 20 can switch its direction of rotation in accordance with the direction of the pressure oil supply from the HST pump 10, so as to move the vehicle forward or backward. For ease of explanation, the vehicle travels forward when the pressure oil is supplied to the HST motor 20 through the hydraulic supply line 1, and the vehicle travels backward when the pressure oil is supplied to the HST motor 20 through the hydraulic supply line 2 in the following description.

This hydraulic drive apparatus also includes a pump capacity setting unit 11, a motor capacity setting unit 21, and a charge pump 5.

The pump capacity setting unit 11 is attached to the HST pump 10, and includes a forward pump electromagnetic proportion control valve (hereinafter referred to as the "forward pump EPC valve 12"), a backward pump electromagnetic proportion control valve (hereinafter referred to as the "backward pump EPC valve 13"), and a pump capacity control cylinder 14. In this pump capacity setting unit 11, when a command signal is supplied from a later-described controller 30 to the forward pump EPC valve 12 and the backward pump EPC valve 13, the pump capacity control cylinder 14 is actuated in accordance with the command signal, so that the swash plate tilt angle of the HST pump 10 is changed. Accordingly, the capacity of the HST pump 10 is changed.

More specifically, the pump capacity control cylinder 14 has a piston 14a held in a neutral position in a no-load state. In this situation, the swash plate tilt angle of the HST pump 10 is zero, and the discharge rate of the pressure oil to the main hydraulic circuit 100 is also zero even when the engine 3 rotates.

When a command signal to increase the capacity of the HST pump 10 is supplied from the controller 30 to the forward pump EPC valve 12 in this situation, a pump control pressure is provided from the forward pump EPC valve 12 to the pump capacity control cylinder 14 in accordance with the command signal, so that the piston 14a moves to the left in FIG. 1. As the piston 14a of the pump capacity control cylinder 14 moves to the left in FIG. 1, the swash plate of the HST pump 10 tilts in the direction in which the pressure oil is discharged toward the hydraulic supply line 1. Since the movement of the piston 14a becomes larger with an increase of a pump control pressure supplied from the forward pump EPC valve 12, the change amount of the tilt angle of the swash plate of the HST pump 10 also becomes larger. In short, when a command signal is supplied from the controller 30 to the forward pump EPC valve 12, the pump control pressure in accordance with the command signal is supplied from the forward pump EPC valve 12 to the pump capacity control cylinder 14, and the swash plate of the HST pump 10 is tilted by the movement of the pump capacity control cylinder 14, so that the HST pump 10 can discharge a desired amount of pressure oil to the hydraulic supply line 1. As the engine 3 is rotated, the pressure oil is supplied from the HST pump 10 to the hydraulic supply line 1, and the HST motor 20 can be rotated in the forward direction.

When a command signal to reduce the capacity of the HST pump 10 is supplied from the controller 30 to the forward pump EPC valve 12 in this situation, the pump control pressure supplied from the forward pump EPC valve 12 to the pump capacity control cylinder 14 in accordance with the command signal decreases, so that the piston 14a moves to the neutral position. As a result, the swash plate tilt angle of the HST pump 10 becomes smaller, and the discharge amount of the pressure oil supplied from the HST pump 10 to the hydraulic supply line 1 becomes smaller.

When a command signal to increase the capacity of the HST pump 10 is supplied from the controller 30 to the backward pump EPC valve 13 in this situation, a pump control pressure is provided from the backward pump EPC valve 13 to the pump capacity control cylinder 14 in accordance with the command signal, so that the piston 14a moves to the right in FIG. 1. As the piston 14a of the pump capacity control cylinder 14 moves to the right in FIG. 1, the swash plate of the HST pump 10 tilts in the direction in which the pressure oil is discharged toward the hydraulic supply line 2. Since the movement of the piston 14a becomes larger with an increase of the pump control pressure supplied from the backward pump EPC valve 13, the change amount of the tilt angle of the swash plate of the HST pump 10 also becomes larger. In short, when a command signal is supplied from the controller 30 to the backward pump EPC valve 13, the pump control pressure in accordance with the command signal is supplied from the backward pump EPC valve 13 to the pump capacity control cylinder 14, and the swash plate of the HST pump 10 is tilted by the movement of the pump capacity control cylinder 14, so that the HST pump 10 can discharge a desired amount of pressure oil to the hydraulic supply line 2. As the engine 3 is rotated, the pressure oil is supplied from the HST pump 10 to the hydraulic supply line 2, and the HST motor 20 can be rotated in the backward direction.

When a command signal to reduce the capacity of the HST pump 10 is supplied from the controller 30 to the backward pump EPC valve 13 in this situation, the pump control pressure supplied from the backward pump EPC valve 13 to the pump capacity control cylinder 14 in accordance with the command signal decreases, so that the piston 14a moves to the neutral position. As a result, the swash plate tilt angle of the HST pump 10 becomes smaller, and the discharge amount of the pressure oil supplied from the HST pump 10 to the hydraulic supply line 2 becomes smaller.

The motor capacity setting unit 21 is attached to the HST motor 20, and includes a motor electromagnetic proportion control valve (hereinafter referred to as the "motor EPC valve 22"), a motor cylinder control valve 23, and a motor capacity control cylinder 24. In this motor capacity setting unit 21, when a command signal is supplied from the controller 30 to the motor EPC valve 22, a motor control pressure is supplied from the motor EPC valve 22 to the motor cylinder control valve 23, and the motor capacity control cylinder 24 is actuated. As the motor capacity control cylinder 24 is actuated, a clinoaxis tilt angle of the HST motor 20 is changed, and the capacity of the HST motor 20 is changed in accordance with the command signal. More specifically, the motor capacity setting unit 21 is designed so that the clinoaxis tilt angle of the HST motor 20 becomes smaller with an increase of the motor control pressure supplied from the motor EPC valve 22.

The charge pump 5 is driven by the vehicle engine 3, and supplies the pump control pressure to the pump capacity control cylinder 14 via the forward pump EPC valve 12 and the backward pump EPC valve 13, and supplies the motor control pressure to the motor cylinder control valve 23 via the motor EPC valve 22.

Reference numeral 6 in FIG. 1 indicates a working machine hydraulic pump that is driven by the vehicle engine 3. This working machine hydraulic pump 6 supplies the pressure oil for driving a hydraulic working machine 7 of a construction machine.

The hydraulic drive apparatus also includes an inching potentiometer 40, a driving mode changing switch 41, a direction input lever switch 42, an engine speed sensor 43, and two pressure detection sensors 44 and 45.

The inching potentiometer 40 outputs detection signals when an inching pedal 40a is operated. Like an inching pedal normally used in a conventional construction machine, the inching pedal 40a is designed to operate when an operator moves the vehicle by a small amount, and is located at a position such that the driver at the driver's seat of the vehicle can step on the inching pedal 40a. In this embodiment, the inching potentiometer 40 that can successively output detection signals in accordance with the pedal stroke is provided on the inching pedal 40a. The detection signals from the inching potentiometer 40 are supplied to the controller 30.

The driving mode changing switch 41 is the switch for allowing the vehicle operator to select a driving mode. A driving mode is set by defining the usage state of the vehicle as the upper limit of the tractive force, (=an upper limit value of an output torque of the HST motor 20). In this embodiment, there are three driving modes with different vehicle traction upper limit values: "high-traction mode", "mid-traction mode", and "low-traction mode" ("high-traction mode">"mid-traction mode">"low-traction mode" in terms of the vehicle traction upper limit value). One of those driving modes can be selected by the driving mode changing switch 41. The driving mode changing switch 41 is provided at such a position as to allow the driver at the driver's seat to select a driving mode. The information indicating the driving mode selected by the driving mode changing switch 41 is supplied as a select signal to the controller 30.

The direction input lever switch 42 is the select switch for inputting the traveling direction of the vehicle. In this embodiment, the direction input lever switch 42 is designed so that one of the three traveling directions, "forward", "neutral", and "backward", can be selected by operating a direction input lever 42a provided at such a position as to allow the driver at the driver's seat to select a traveling mode. The information indicating the traveling direction selected by the direction input lever switch 42 is supplied as select information to the controller 30.

The engine speed sensor 43 detects an engine speed of the engine 3. The pressure detection sensors 44 and 45 respectively detect pressures of pressure oil flowing through the hydraulic supply lines 1 and 2 between the HST pump 10 and the HST motor 20. The information indicating the engine speed of the engine 3 detected by the engine speed sensor 43, and the information indicating the pressures of the hydraulic supply lines 1 and 2 sensed by the pressure detection sensors 44 and 45 are supplied as detection signals to the controller 30.

Figure 2:
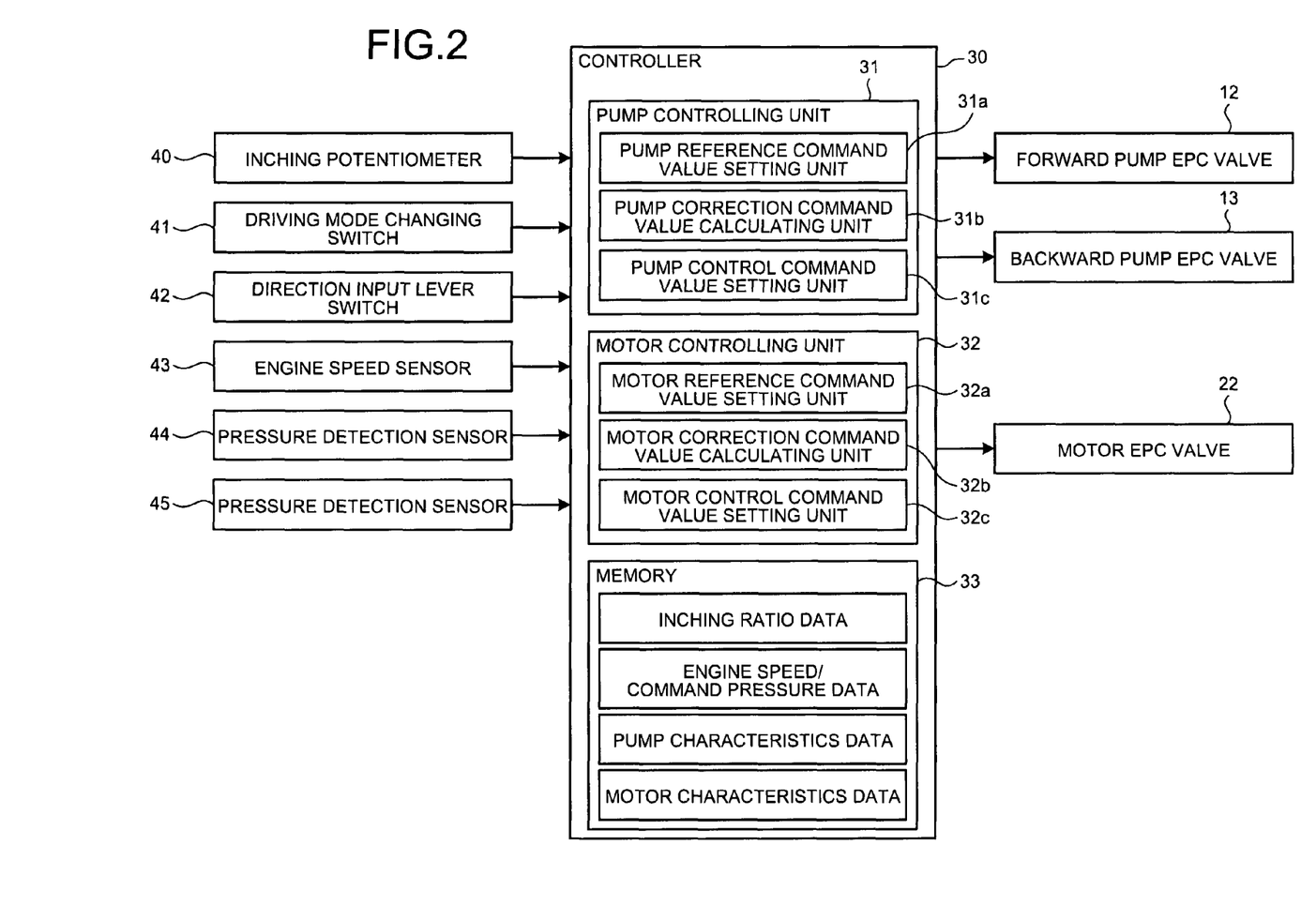
FIG. 2 is a block diagram showing the control system of the hydraulic drive apparatus shown in FIG. 1.

The hydraulic drive apparatus also includes the controller 30. The controller 30 is an electronic control device that generates command signals for the forward pump EPC valve 12, the backward pump EPC valve 13, and the motor EPC valve 22, in accordance with the input signals supplied from the inching potentiometer 40, the driving mode changing switch 41, the direction input lever switch 42, the engine speed sensor 43, and the pressure detection sensors 44 and 45. The controller 30 supplies the generated command signals to the respective EPC valves 12, 13, and 22. The controller 30 of this embodiment includes a pump controlling unit 31 and a motor controlling unit 32, as shown in FIG. 2.

Figure 4:
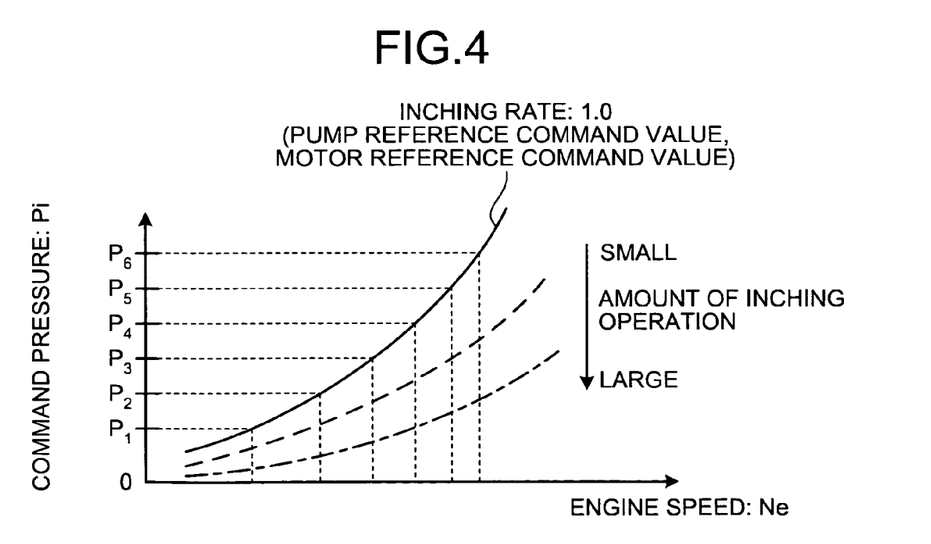
FIG. 4 is a graph showing an example of an engine speed/command pressure data used in the hydraulic drive apparatus shown in FIG. 1.
Figure 5:
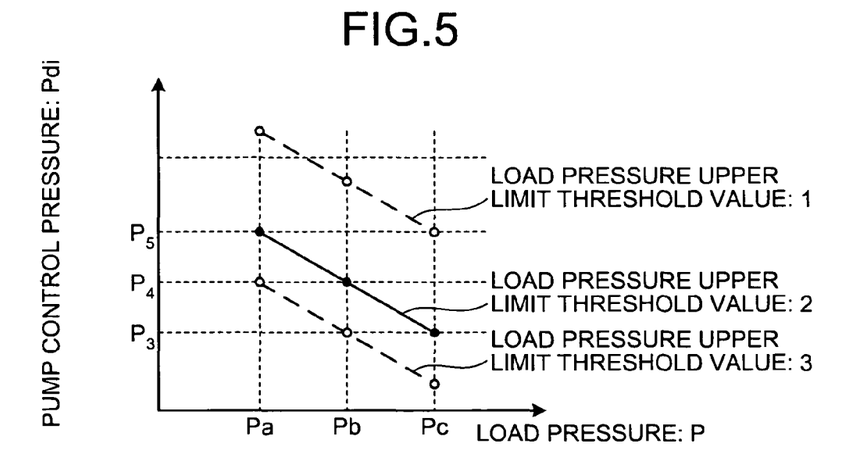
FIG. 5 is a graph showing an example of a relationship between a load pressure and a pump control pressure of the hydraulic pump employed in the hydraulic drive apparatus shown in FIG. 1.
Figure 6:
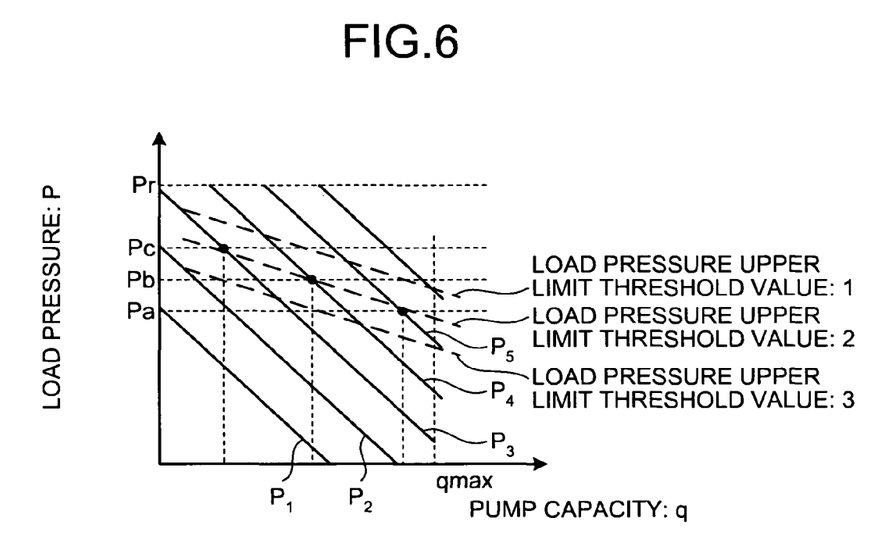
FIG. 6 is a graph showing an example of the relationship between the pump capacity and the load pressure of the hydraulic pump employed in the hydraulic drive apparatus shown in FIG. 1.

When receiving input signals from the inching potentiometer 40, the engine speed sensor 43, the direction input lever switch 42, the driving mode changing switch 41, and the pressure detection sensors 44 and 45, the pump controlling unit 31 sets a pump control command value for controlling the capacity of the HST pump 10, based on those input signals and the data stored beforehand in the memory 33, and outputs the pump control command value as a command signal to the forward pump EPC valve 12 or the backward pump EPC valve 13. The data to be referred to by the pump controlling unit 31 to set the pump control command value includes inching rate data (see FIG. 3), engine speed/command pressure data (FIG. 4), and pump characteristics data (FIGS. 5 and 6). As shown in FIG. 2, the pump controlling unit 31 of this embodiment includes a pump reference command value setting unit 31*a*, a pump correction command value calculating unit 31*b*, and a pump control command value setting unit 31*c*.

The pump reference command value setting unit 31*a* sets a pump reference command value for the HST pump 10, based on the input signal from the engine speed sensor 43 and the engine speed/command pressure data that is set in advance. FIG. 4 shows an example of the engine speed/command pressure data to be used in this embodiment. As indicated by the solid line in FIG. 4, the command pressure with respect to the engine speed is set so that the increase rate of the command pressure becomes higher as the engine speed of the engine increases.

Figure 3:
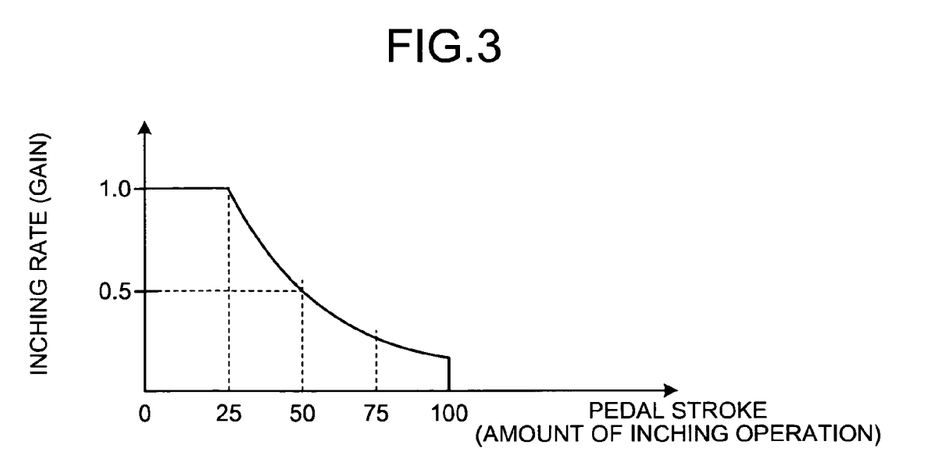
FIG. 3 is a graph showing an example of the relationship between a pedal stroke and a inching rate of a inching pedal employed in the hydraulic drive apparatus shown in FIG. 1.

The pump correction command value calculating unit 31*b* corrects the pump reference command value, based on the input signal from the inching potentiometer 40 and the inching rate data that is set in advance. The pump correction command value calculating unit 31*b* then outputs the corrected value as a pump command value. FIG. 3 shows an example of the inching rate data to be used in this embodiment. In the inching rate data shown in FIG. 3, the inching rate (=the gain) is set in accordance with the pedal stroke (or the amount of inching operation) of the inching pedal 40*a*. More specifically, the inching rate is set at 1.0 when the pedal stroke of the inching pedal 40*a* falls into the range of 0 to 25%, and thereafter, the inching rate becomes lower as the pedal stroke becomes larger.

The pump control command value setting unit 31*c* sets a pump control command upper limit, based on the input signals from the direction input lever switch 42 and the pressure detection sensors 44 and 45, and pump control pressure/load pressure data that is set in advance. The pump control command value setting unit 31*c* also sets a pump control command value that is the pump command value output from the pump correction command value calculating unit 31*b* or the pump control command upper limit, whichever is smaller.

Here, the load pressure is the pressure of one of the hydraulic supply lines 1 and 2 provided between the HST pump 10 and the HST motor 20, and is the pressure of hydraulic supply line 1 or 2 in the forward direction with respect to the rotational direction of the HST motor 20. For example, when the HST motor 20 is rotating in the forward direction, the detection result of the pressure detection sensor 44 provided at the hydraulic supply line 1 represents the load pressure. When the HST motor 20 is rotating in the backward direction, the detection result of the pressure detection sensor 45 provided at the hydraulic supply line 2 represents the load pressure.

FIG. 5 shows the pump control pressure/load pressure data to be used in this embodiment. The pump control pressure/load pressure data is set based on the load pressure/pump capacity data shown in FIG. 6, and the pump control command upper limit corresponding to a load pressure is set beforehand for each of a plurality of load pressure upper limit threshold values. The load pressure upper limit threshold value is unambiguously set when a driving mode is selected by the driving mode changing switch 41. There are the following load pressure upper limit threshold values: the load pressure upper limit threshold value "1" of the "high-traction mode">the load pressure upper limit threshold value "2" of the "mid-traction mode">the load pressure upper limit threshold value "3" of the "low-traction mode". As is apparent from FIG. 6, the HST pump 10 of this embodiment has the function to prevent the engine 3 from stalling by lowering the capacity to reduce the drive torque when the load pressure is increased (a so-called anti-stall function).

Figure 7:
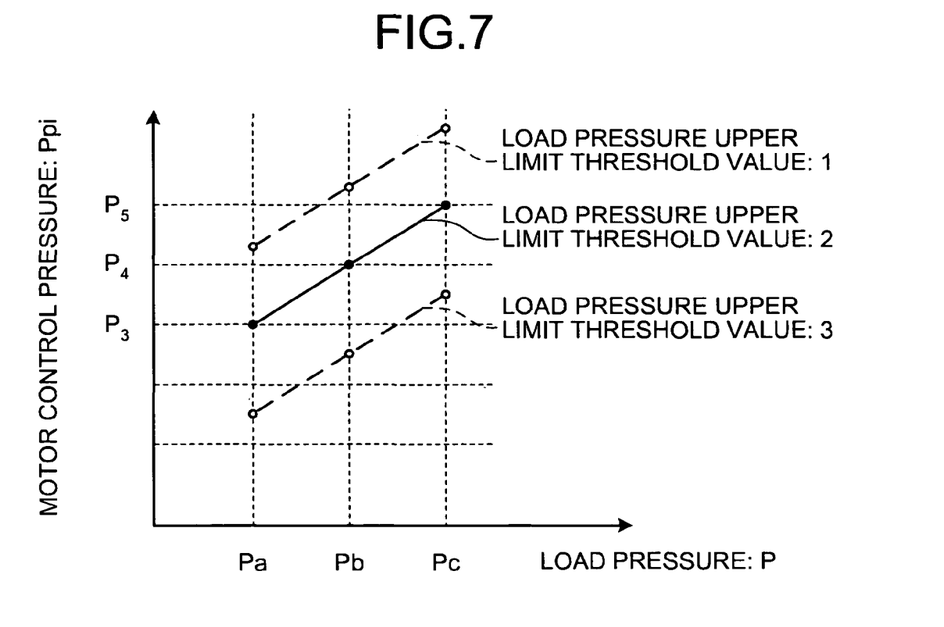
FIG. 7 is a graph showing an example of the relationship between the load pressure and the motor control pressure of the hydraulic motor employed in the hydraulic drive apparatus shown in FIG. 1.
Figure 8:
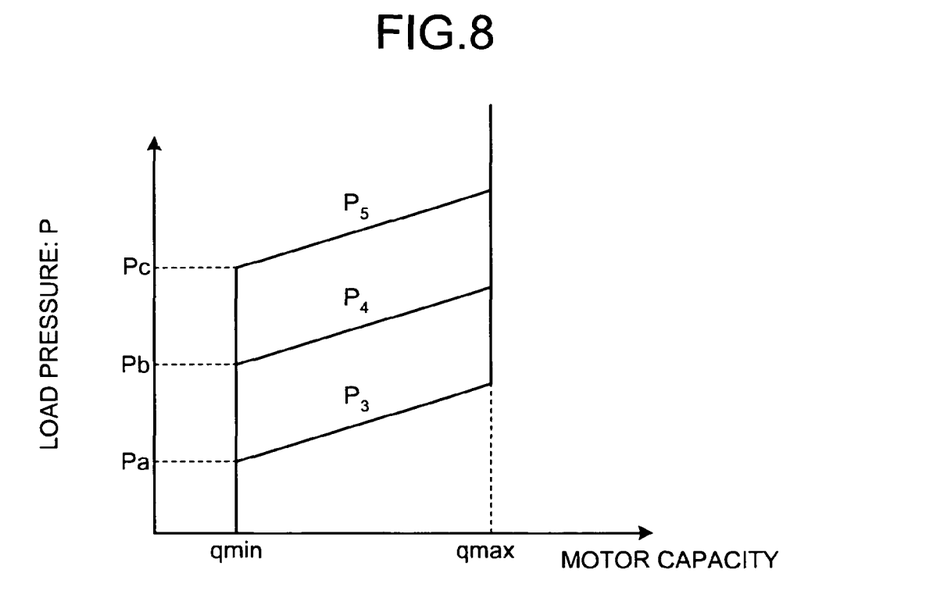
FIG. 8 is a graph showing an example of the relationship between the motor capacity and the load pressure of the hydraulic motor employed in the hydraulic drive apparatus shown in FIG. 1.

When receiving input signals from the inching potentiometer 40, the engine speed sensor 43, and the pressure detection sensors 44 and 45, the motor controlling unit 32 sets a motor control command value for controlling the capacity of the HST motor 20, based on those input signals and the data stored beforehand in the memory 33, and outputs the motor control command value as a command signal to the motor EPC valve 22. The data to be referred to by the motor controlling unit 32 to set the motor control command value includes inching rate data (see FIG. 3), engine speed/command pressure data (FIG. 4), and motor characteristics data (FIGS. 7 and 8). As shown in FIG. 2, the motor controlling unit 32 of this embodiment includes a motor reference command value setting unit 32*a*, a motor correction command value calculating unit 32*b*, and a motor control command value setting unit 32*c*.

The motor reference command value setting unit 32*a* sets a motor reference command value for the HST motor 20, based on the input signal from the engine speed sensor 43 and the engine speed/command pressure data that is set in advance. The engine speed/command pressure data is shown in FIG. 4.

The motor correction command value calculating unit 32*b* corrects the motor reference command value, based on the input signal from the inching potentiometer 40 and the inching rate data that is set in advance as shown in FIG. 3. The motor correction command value calculating unit 32*b* then outputs the corrected value as a motor command value.

The motor control command value setting unit 32*c* sets a motor control command upper limit, based on the input signals from the direction input lever switch 42 and the pressure detection sensors 44 and 45, and motor control pressure/load pressure data that is set in advance. The motor control command value setting unit 32*c* also sets a motor control command value as the motor command value output from the motor correction command value calculating unit 32*b* or the motor control command upper limit, whichever is smaller.

FIG. 7 shows the motor control pressure/load pressure data to be used in this embodiment. The motor control pressure/load pressure data is set based on the load pressure/motor capacity data shown in FIG. 8, and the motor control command upper limit corresponding to load pressure is set beforehand for each load pressure upper limit threshold value. As described above, there are the following load pressure upper limit threshold values: the load pressure upper limit threshold value "1" of the "high-traction mode">the load pressure upper limit threshold value "2" of the "mid-traction mode">the load pressure upper limit threshold value "3" of the "low-traction mode".

Figure 9:
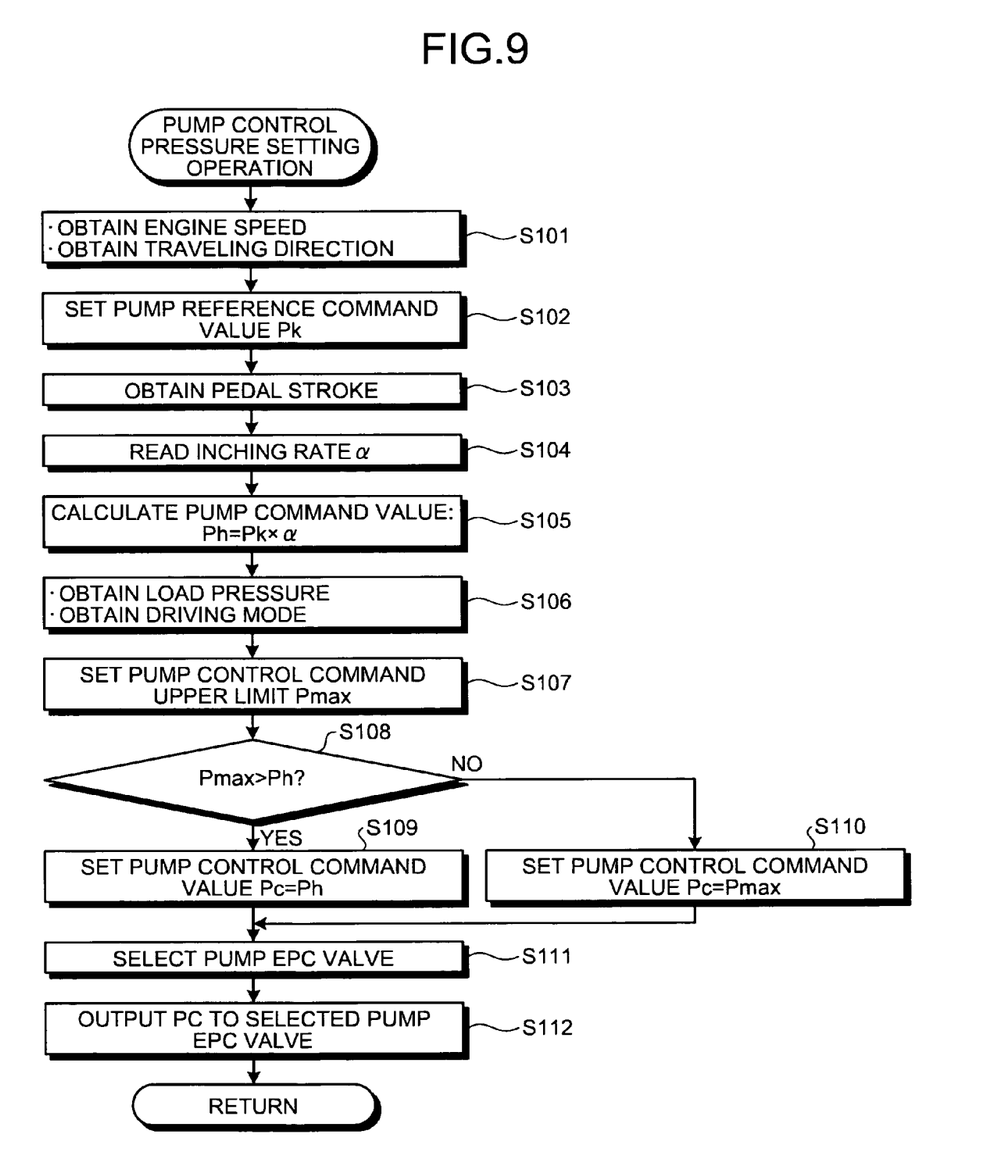
FIG. 9 is a flowchart showing an operation to be performed by the pump controlling unit of the controller shown in FIG. 2.
Figure 10:
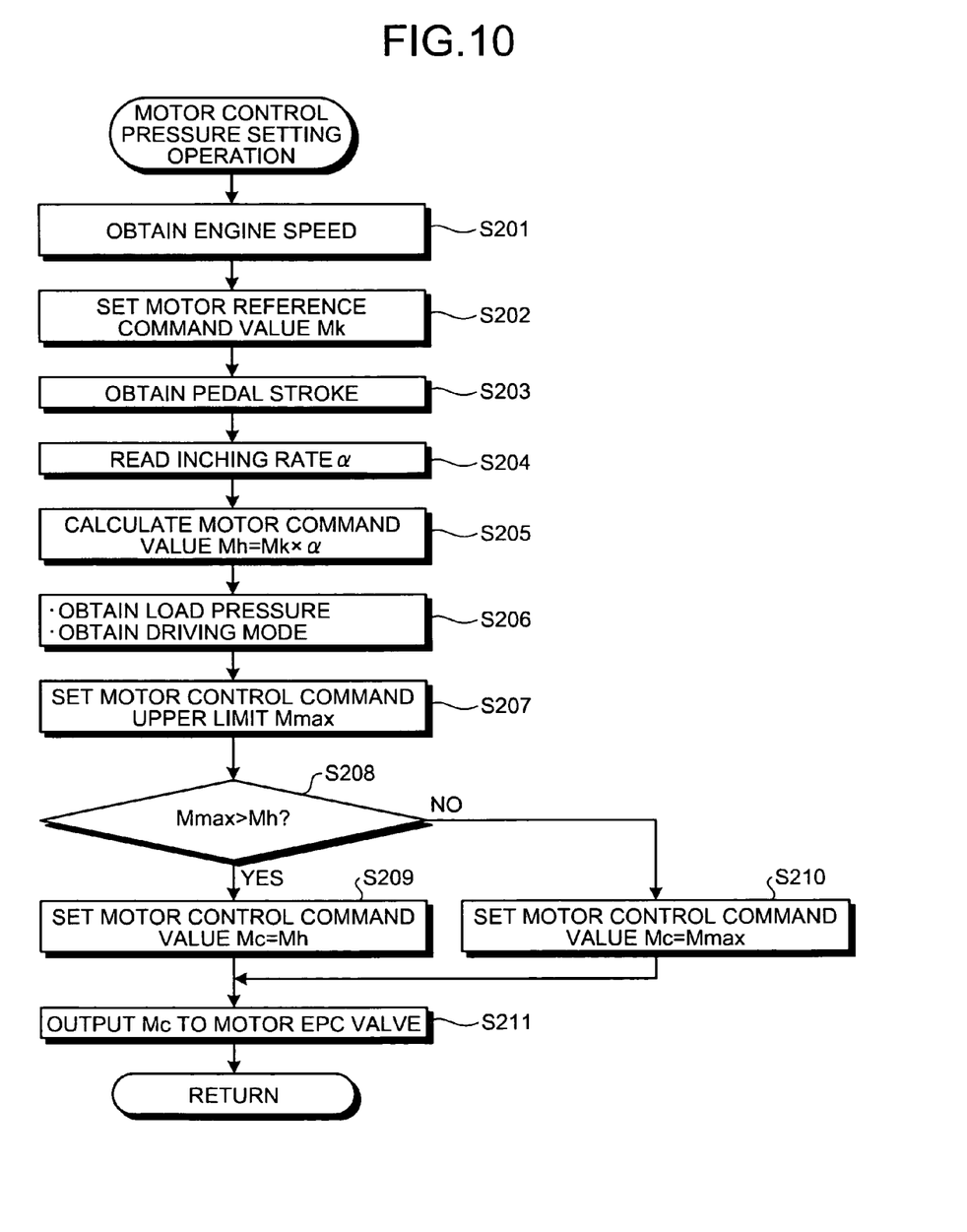
FIG. 10 is a flowchart showing an operation to be performed by the motor controlling unit of the controller shown in FIG. 2.

FIG. 9 is a flowchart showing a pump control pressure setting process to be performed by the pump controlling unit 31 of the controller 30. FIG. 10 is a flowchart showing a motor control pressure setting process to be performed by the motor controlling unit 32 of the controller 30. Referring now to those flowcharts, the operations of the hydraulic drive apparatus are described.

In the pump control pressure setting process shown in FIG. 9, the pump controlling unit 31 first obtains the engine speed of the engine 3 from the engine speed sensor 43, and obtains the traveling direction of the vehicle from the direction input lever switch 42 (step S101). Having obtained the engine speed information about the engine 3, the pump controlling unit 31 sets the pump reference command value for the HST pump 10 in accordance with the engine speed of the engine 3, based on the engine speed/command pressure data stored in the memory 33 (step S102).

The pump controlling unit 31 obtains the pedal stroke of the inching pedal 40a from the inching potentiometer 40 (step S103), and reads the inching rate based on the pedal stroke and the inching rate data stored in the memory 33 (step S104). Having read the inching rate, the pump controlling unit 31 sets the pump command value that is the product of the inching rate and the pump reference command value (step S105).

As a result, when the inching pedal 40a is operated by the operator to move the vehicle by a small amount or stop the vehicle, a pump command value that is reduced as indicated by the broken line or the dot-and-dash line in FIG. 4 is set as opposed to the pump reference command value that is determined from the engine speed when an inching operation is not performed, as indicated by the solid line in FIG. 4.

Having set the pump command value, the pump controlling unit 31 obtains the load pressure of the main hydraulic circuit 100 through the direction input lever switch 42 and the pressure detection sensors 44 and 45, and also obtains the present driving mode from the driving mode changing switch 41 (step S106). Further, the pump controlling unit 31 sets the pump control command upper limit, based on the pump control pressure/load pressure data which is obtained from the load pressure upper limit threshold value determined from the driving mode and the load pressure (step S107).

Having set the pump control command upper limit and the pump command value in step S105, the pump controlling unit 31 compares the pump control command upper limit with the pump command value (step S108), and sets the smaller value as the pump control command value (steps S109 and S110).

The pump controlling unit 31 further selects a pump EPC valve to be controlled from the pump EPC valves 12 and 13, based on the vehicle traveling direction obtained from the direction input lever switch 42 (step S111). The pump controlling unit 31 then outputs an appropriate current according to the pump control command value, to the selected pump EPC valve (step S112).

Accordingly, the swash plate tilt angle of the HST pump 10 varies with the pump control pressure represented by the pump control command value, and the HST pump 10 is driven, with the capacity corresponding to the varying swash plate tilt angle.

In this hydraulic drive apparatus, the pump capacity setting unit 11 is designed so that the swash plate tilt angle of the HST pump 10 varies with the pump control pressure supplied to the pump capacity control cylinder 14 from the forward pump EPC valve 12 or the backward pump EPC valve 13. Accordingly, when the pump control pressure is reduced in accordance with an inching operation, the swash plate tilt angle of the HST pump 10 becomes smaller than the swash plate tilt angle observed in a case where an inching operation is not performed. In other words, when an inching operation is performed, the pump command value is reduced in accordance with the pedal stroke, and accordingly, the pump control command value or the pump control pressure that is set based on the pump command value is also reduced. Therefore, in a case where an inching operation is performed even though the engine is driven at a fixed engine speed, the movement of the piston 14a of the pump capacity control cylinder 14 from the neutral position becomes smaller. Accordingly, the swash plate tilt angle of the HST pump 10 becomes smaller, and the capacity of the HST pump 10 is set at a smaller value. As a result, the discharge amount of the pressure oil to the main hydraulic circuit 100 also becomes smaller. In this manner, the load pressure of the main hydraulic circuit 100 can be restricted, and the hydraulic efficiency of the hydraulic drive apparatus can be made higher.

The hydraulic efficiency can be made higher simply by performing an inching operation, regardless of the engine speed of the engine 3. Accordingly, the load pressure of the main hydraulic circuit 100 can be restricted over the entire engine speed range, without being restricted by the engine speed.

Conventionally, an inching operation in a construction machine is normally performed when the vehicle is moved by a small amount, and is not a special-purpose operation to be selected by the operator in accordance with the desired state of load pressure. Like the inching pedal in a conventional construction machine, the inching pedal 40a that performs an inching operation is located at such a position that the driver at the driver's seat of the vehicle can step on the inching pedal 40a. With this arrangement, by performing the same operations as those in a conventional construction machine, the above effects can be achieved without the operator paying any special attention, and there is not a possibility that the operations of the hydraulic drive apparatus become complicated.

Thereafter, the pump control pressure setting process is repeatedly performed every predetermined cycle time, so that the hydraulic drive apparatus is driven by the HST pump 10 that has its capacity set in accordance with the engine speed of the engine 3, whether there is an inching operation, and the load pressure of the main hydraulic circuit 100.

Meanwhile, in the motor control pressure setting process shown in FIG. 10, the motor controlling unit 32 first obtains the engine speed of the engine 3 from the engine speed sensor 43 (step S201). Based on the engine speed information about the engine 3 and the engine speed/command pressure data stored in the memory 33, the motor controlling unit 32 sets the motor reference command value for the HST motor 20 in accordance with the engine speed of the engine 3 (step S202).

The motor controlling unit 32 obtains the pedal stroke of the inching pedal 40a from the inching potentiometer 40 (step S203), and reads the inching rate based on the pedal stroke and the inching rate data stored in the memory 33 (step S204). The motor controlling unit 32 further sets the motor command value that is the product of the motor reference command value set in step S202 and the inching rate read in step S204 (step S205).

As a result, when the inching pedal 40a is operated by the operator to move the vehicle by a small amount or stop the vehicle, a motor command value that is reduced as indicated by the broken line or the dot-and-dash line in FIG. 4 is set as opposed to the motor reference command value that is determined from the engine speed when an inching operation is not performed, as indicated by the solid line in FIG. 4.

Having set the motor command value, the motor controlling unit 32 obtains the load pressures of the hydraulic supply lines 1 and 2 through the direction input lever switch 42 and the pressure detection sensors 44 and 45, and also obtains the present driving mode from the driving mode changing switch 41 (step S206). Further, the motor controlling unit 32 sets the motor control command upper limit, based on the load pressure upper limit threshold value determined from the driving mode, the load pressure, and the motor control pressure/load pressure data (step S207). The motor controlling unit 32 then compares the motor control command upper limit with the motor command value set in step S205 (step S208), and sets the smaller value as the motor control command value (steps S209 and S210). After that, the motor controlling unit 32 outputs a appropriate current according to the motor control command value, to the motor EPC valve 22 (step S211), and the routine then returns to the top. Accordingly, the clinoaxis tilt angle of the HST motor 20 varies with the motor control pressure represented by the motor control command value, and the HST motor 20 is driven, with the capacity corresponding to the varying clinoaxis tilt angle.

In this HST motor 20, the motor capacity setting unit 21 is designed so that the clinoaxis tilt angle of the HST motor 20 varies with the motor control pressure supplied to the motor cylinder control valve 23 from the motor EPC valve 22. Accordingly, when the motor control pressure is reduced in accordance with an inching operation, the capacity of the HST motor 20 is set at a larger value than the capacity set in a case where an inching operation is not performed. When the capacity of the HST motor 20 is set at a large value, the load pressure of the main hydraulic circuit 100 including the hydraulic supply lines 1 and 2 is reduced. In this manner, the load pressure of the main hydraulic circuit 100 can be restricted, and the hydraulic efficiency of the hydraulic drive apparatus can be made higher.

The hydraulic efficiency can be made higher simply by performing an inching operation, regardless of the engine speed of the engine 3. Accordingly, the load pressure of the main hydraulic circuit 100 can be restricted over the entire engine speed range, without being restricted by the engine speed.

Conventionally, an inching operation in a construction machine is normally performed when the vehicle is moved by a small amount, and is not a special-purpose operation to be selected by the operator in accordance with the desired state of load pressure. Like the inching pedal in a conventional construction machine, the inching pedal 40a that performs an inching operation is located at such a position that the driver at the driver's seat of the vehicle can step on the inching pedal 40a. With this arrangement, by performing the same operations as those in a conventional construction machine, the above effects can be achieved without the operator paying any special attention, and there is not a possibility that the operations of the hydraulic drive apparatus become complicated.

Thereafter, the motor control pressure setting process is repeatedly performed every predetermined cycle time, so that the hydraulic drive apparatus is driven by the HST pump 20 that has its capacity set in accordance with the engine speed of the engine 3, whether there is an inching operation, and the load pressure of the main hydraulic circuit 100.

As described so far, in the pump control pressure setting process to be performed by the pump controlling unit 31 of the controller 30 in the hydraulic drive apparatus, the pump control pressure is set in accordance with an inching operation and the load pressure of the main hydraulic circuit 100, and the load pressure of the main hydraulic circuit 100 including the hydraulic supply lines 1 and 2 can be reduced. In the motor control pressure setting process to be performed by the motor controlling unit 32 of the controller 30, the motor control pressure is set in accordance with an inching operation and the load pressure of the main hydraulic circuit 100, and the load pressure of the main hydraulic circuit 100 including the hydraulic supply lines 1 and 2 can be reduced. Accordingly, with the above hydraulic drive apparatus, the pressure loss can be reduced, and the hydraulic efficiency can be made higher.

Furthermore, the effects can be achieved over the entire engine speed range of the engine 3, since the load pressure can be reduced as long as an inching operation is performed.

Since there is no need to prepare hardware such as a cutoff valve, the production costs can be lowered. Further, the pump control pressure and the motor control pressure can be readily changed by adjusting the inching rate, and the hydraulic drive apparatus can be flexibly controlled.

Also, by selecting a driving mode through the driving mode changing switch 41, the load pressure upper limit threshold value is changed, and the upper limit of the pump control pressure is changed in accordance with the load pressure upper limit threshold value. Accordingly, the load pressure upper limit of the main hydraulic circuit 100 including the hydraulic supply lines 1 and 2 can be changed in accordance with the upper limit of the tractive force required for the vehicle, and the change of the load pressure upper limit of the main hydraulic circuit 100 contributes to an increase in the hydraulic efficiency.

In the above embodiment, the pump control command value of the HST pump 10 and the motor control command value of the HST motor 20 are both corrected in accordance with the inching rate. However, the correction may be performed only on one of the two command values.

Although the above embodiment concerns a hydraulic drive apparatus for moving a vehicle, the present invention may be applied not only to drive apparatuses for driving vehicles but also to general-purpose drive apparatuses.

Further, in this embodiment, an output torque upper limit of the HST motor 20 is set by selecting a driving mode. However, the present invention is not limited to that, and it is possible to directly input an output torque upper limit. In that case, the number of output torque upper limits is not limited to three, and it is possible to set more than three output torque upper limits or successively input desired values.

The invention claimed is:

1. A hydraulic drive apparatus including a variable displacement hydraulic pump that is driven by an engine and a hydraulic motor of a variable capacity type that is driven by pressure oil discharged from the hydraulic pump, and outputting drive force of the hydraulic motor, the hydraulic drive apparatus comprising a pump control unit that includes:

a pump reference command value setting unit that sets a pump reference command value for the hydraulic pump in accordance with an engine speed of the engine;

a pump correction command value calculating unit that sets a pump command value by determining an inching rate in accordance with an amount of operation when an inching operation is performed, and correcting the pump reference command value in accordance with the inching rate; and a pump control command value setting unit that sets a pump control command value for controlling capacity of the hydraulic pump, based on the pump command value set by the pump correction command value calculating unit, wherein the pump control command value setting unit sets a pump control command upper limit in accordance with pressure of the pressure oil flowing between the hydraulic pump and the hydraulic motor, sets the pump command value to the pump control command value when the pump command value is equal to or smaller than the pump control command upper limit, and sets the pump control command upper limit to the pump control command value when the pump command value is larger than the pump control command upper limit.

2. A hydraulically-driven vehicle comprising the hydraulic drive apparatus according to claim 1 as a drive source to move.

3. A hydraulic drive apparatus including a variable displacement hydraulic pump that is driven by an engine and a hydraulic motor of a variable capacity type that is driven by pressure oil discharged from the hydraulic pump, and outputting drive force of the hydraulic motor, the hydraulic drive apparatus comprising a pump control unit that includes:

a pump reference command value setting unit that sets a pump reference command value for the hydraulic pump in accordance with an engine speed of the engine;

a pump correction command value calculating unit that sets a pump command value by determining an inching rate in accordance with an amount of operation when an inching operation is performed, and correcting the pump reference command value in accordance with the inching rate;

a pump control command value setting unit that sets a pump control command value for controlling capacity of the hydraulic pump, based on the pump command value set by the pump correction command value calculating unit; and a torque upper limit setting unit that sets an upper limit of output torque required for the hydraulic motor, wherein the pump controlling unit sets the pump control command upper limit in accordance with the upper limit of the output torque set by the torque upper limit setting unit, and sets the pump control command value in accordance with the pump control command upper limit.

4. A hydraulic drive apparatus including a variable displacement hydraulic pump that is driven by an engine and a hydraulic motor of a variable capacity type that is driven by pressure oil discharged from the hydraulic pump, and outputting drive force of the hydraulic motor, the hydraulic drive apparatus comprising a motor control unit that includes:

a motor reference command value setting unit that sets a motor reference command value for the hydraulic motor in accordance with an engine speed of the engine;

a motor correction command value calculating unit that sets a motor command value by determining an inching rate in accordance with an amount of operation when an inching operation is performed, and correcting the motor reference command value in accordance with the inching rate; and a motor control command value setting unit that sets a motor control command value for controlling capacity of the hydraulic motor, based on the motor command value set by the motor correction command value calculating unit wherein the motor control command value setting unit sets a motor control command upper limit in accordance with pressure of pressure oil flowing between the hydraulic pump and the hydraulic motor, sets the motor command value to the motor control command value when the motor command value is equal to or smaller than the motor control command upper limit, and sets the motor control command upper limit to the motor control command value when the motor command value is larger than the motor control command upper limit.

5. A hydraulic drive apparatus including a variable displacement hydraulic pump that is driven by an engine and a hydraulic motor of a variable capacity type that is driven by pressure oil discharged from the hydraulic pump, and outputting drive force of the hydraulic motor, the hydraulic drive apparatus comprising a control unit that includes:

a pump reference command value setting unit that sets a pump reference command value for the hydraulic pump in accordance with an engine speed of the engine;

a motor reference command value setting unit that sets a motor reference command value for the hydraulic motor in accordance with the engine speed of the engine;

a pump correction command value calculating unit that sets a pump command value by determining an inching rate in accordance with an amount of operation when an inching operation is performed, and correcting the pump reference command value in accordance with the inching rate;

a motor correction command value calculating unit that sets a motor command value by determining an inching rate in accordance with an amount of operation when an inching operation is performed, and correcting the motor reference command value in accordance with the inching rate;

a pump control command value setting unit that sets a pump control command value for controlling capacity of the hydraulic motor, based on the pump command value set by the pump correction command value calculating unit; and a motor control command value setting unit that sets a motor control command value for controlling capacity of the hydraulic motor, based on the motor command value set by the motor correction command value calculating unit, wherein the pump control command value setting unit sets a pump control command upper limit in accordance with pressure of the pressure oil flowing between the hydraulic pump and the hydraulic motor, sets the pump command value to the pump control command value when the pump command value is equal to or smaller than the pump control command upper limit, and sets the pump control command upper limit to the pump control command value when the pump command value is larger than the pump control command upper limit, and the motor control command value setting unit sets a motor control command upper limit in accordance with pressure of pressure oil flowing between the hydraulic pump and the hydraulic motor, sets the motor command value to the motor control command value when the motor command value is equal to or smaller than the motor control command upper limit, and sets the motor control command upper limit to the motor control command value when the motor command value is larger than the motor control command upper limit.

\* \* \* \* \*